United States Patent
Hall et al.

(10) Patent No.: US 7,072,887 B1
(45) Date of Patent: Jul. 4, 2006

(54) SYSTEM AND METHOD FOR IDENTIFYING COMPATIBLE ASSOCIATIONS BETWEEN ENTITIES

(75) Inventors: Andrea M. Hall, Marietta, GA (US); Camille Evans, Marietta, GA (US); Ray B. Hollifield, Lawrenceville, GA (US)

(73) Assignee: Mirant Intellectual Asset Management and Marketing, LLC, Atlanta, GA (US)

( * ) Notice: Subject to any disclaimer, the term of this patent is extended or adjusted under 35 U.S.C. 154(b) by 521 days.

(21) Appl. No.: 10/126,053

(22) Filed: Apr. 19, 2002

(51) Int. Cl.
*G06F 17/30* (2006.01)

(52) U.S. Cl. ............... 707/4; 707/9; 707/100; 707/102

(58) Field of Classification Search ............... 705/27, 705/51, 80, 26; 707/100; 709/202, 217
See application file for complete search history.

(56) References Cited

U.S. PATENT DOCUMENTS

2004/0030616 A1* 2/2004 Florance et al. ............... 705/27

* cited by examiner

*Primary Examiner*—Charles Rones
*Assistant Examiner*—Belix M. Ortiz
(74) *Attorney, Agent, or Firm*—Smith Frohwein Tempel Greenlee Blaha LLC; Gregory Scott Smith

(57) ABSTRACT

A system and method for identifying compatible associations between entities. The present invention stores data regarding compatibility factors for entities and provides searching capabilities on the data. In a preferred embodiment, the present invention identifies compatible matches for communities and companies. In this embodiment, the system stores industry data regarding the needs of the industries, and community data regarding the communities' resources for satisfying the respective needs of the industries. The system uses industry criteria, industry criterion weights, and industry criterion minimum levels to identify which community attributes are important to the particular industry. Communities are matched to companies within an industry through customized searches operable to identify communities which are compatible with certain industries or companies.

2 Claims, 4 Drawing Sheets

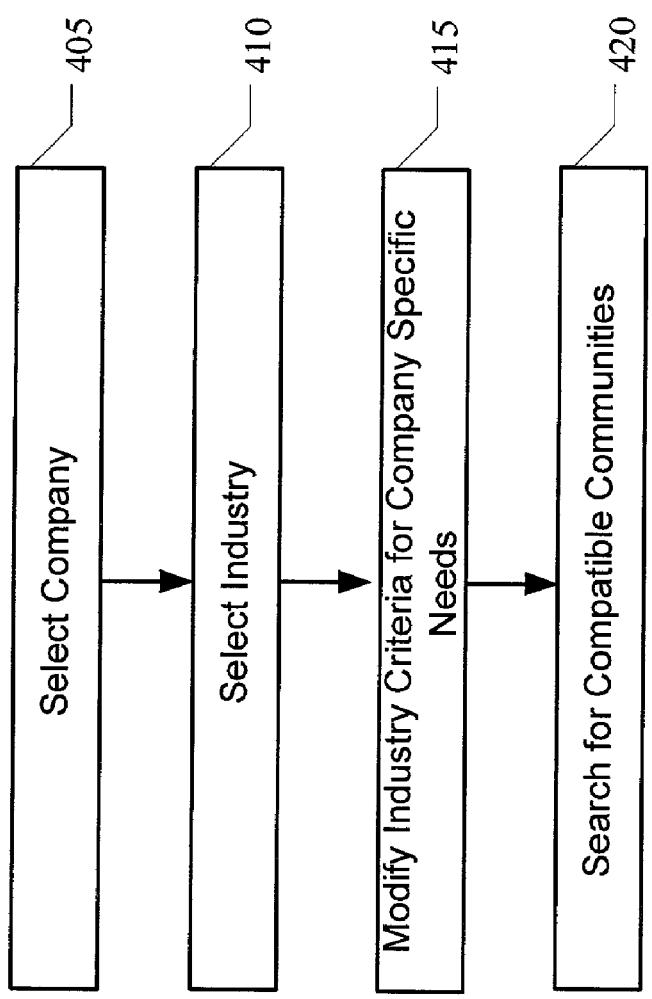

SYSTEM AND METHOD FOR IDENTIFYING COMPATIBLE ASSOCIATIONS BETWEEN ENTITIES

TECHNICAL FIELD

This invention relates generally to computer software systems, and more particularly to a system and method for identifying compatible associations between communities and industries.

BACKGROUND OF THE INVENTION

Since the beginning of the modern age of industrial development, cities, towns, and communities have sought to attract businesses to increase the quality and quantity of the jobs available. Similarly, businesses have sought cities, towns, and communities which would provide a suitable center for operations. Through this process, companies wish to find communities with a good supply of qualified workers and adequate resources to carry out their business.

Without an organized process, communities may not recognize what types of businesses would thrive and which would fail. Similarly, businesses may travel all over the world trying to find the right location to set up shop. Typically, communities and businesses are limited to recruitment of compatible partners with which they are already familiar. Accordingly, it is difficult for communities and businesses to branch out and identify good matches among the millions of communities and businesses in the world.

In an effort to combat these problems, economic development professionals study the needs and attributes of communities and businesses and advise clients on good matches. These professionals may work with a community to determine what type of business would fit best into the community. Even the best economic development professional is limited by his or her knowledge of the various industries and their respective needs.

Therefore, it is apparent that there is a need in the art for a system and method for matching companies and communities with compatible respective communities and companies.

In addition, the principles and procedures applicable for identifying compatible associations between businesses and communities can be applied to a variety of industries. For example, suppliers and purchasers, job opportunities and potential employees, sellers and buyers, forums and speakers, as well as countless other pairings.

SUMMARY OF THE INVENTION

The present invention provides a solution to the problems in existence with the utilization of a software product to link various entities. More particularly, an embodiment of the present invention links up communities and businesses. The present invention solves these problems, and other problems, by providing a system and method for communities and companies to analyze their respective qualities to identify compatible couplings.

One feature of the present invention is a system and method for storing industry data regarding the needs of the industry. Industry data may include, but is not limited to, industry criteria, industry criteria weights, and industry criteria minimum levels. Additionally, the industry data may include a data base of all companies within a given industry.

Another aspect of the present invention is a system and method for storing company data. Company data may include, but is not limited to, modified industry data, company financial information, company contact information, and company office locations. The modified industry data generally is used to adjust the industry data to more accurately reflect the needs of the particular company. Many companies will not require customized modified industry data because the many companies share the common needs of other companies within the industry.

Another aspect of the present invention is a system and method for storing community data. Community data may include, but is not limited to, industry criteria data corresponding to each community's attributes with respect to each industry's criteria. Additionally, community data may include information about the location, size, and climate of the community.

Another aspect of the present invention is a system and method of matching communities to industries and companies. This matching is generally performed through customized searches operable to identify communities which are compatible with certain industries or companies.

Other objects, features, and advantages of the present invention will become apparent upon reading the following detailed description of the embodiments of the invention, when taken in conjunction with the accompanying drawings and appended claims.

BRIEF DESCRIPTION OF THE DRAWINGS

FIG. 4 is a flow diagram illustrating a method for companies to identify compatible communities.

DETAILED DESCRIPTION

Figure 1:
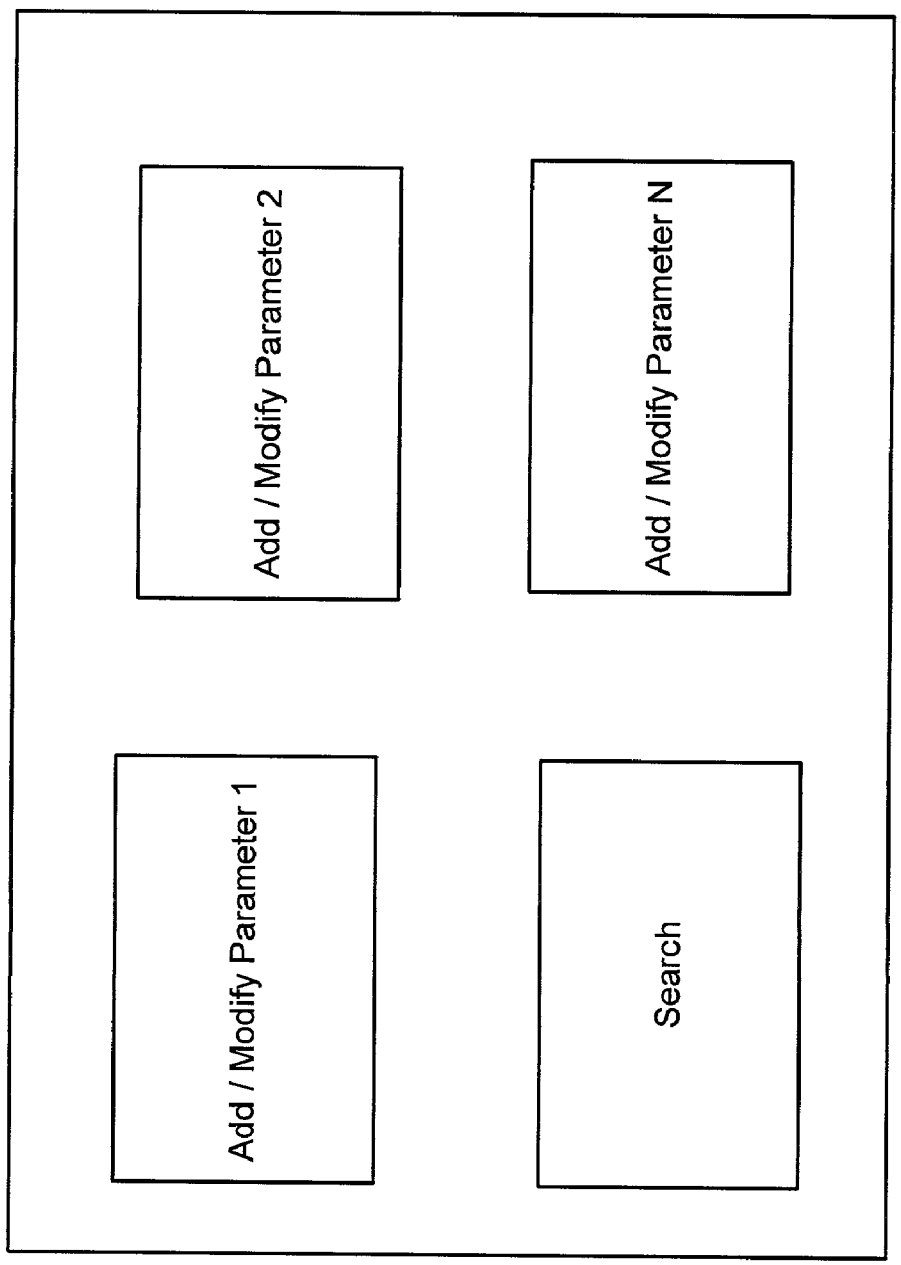
FIG. 1 is a block diagram that illustrates the principle functions of the present invention.

Referring now to the drawings, in which like numerals refer to like parts throughout the several views, exemplary embodiments of the present invention are described. Throughout the detailed description, reference will be made to the operation of the present invention when embodied within a computing device. Computing devices may include, but are not limited to, personal computers, mainframe computers, servers, and any other device capable of executing the software associated with the present invention. However, it should be understood that the features and aspects of the present invention can be ported into a variety of systems and system/network configurations and any examples provided within this description are for illustrative purposes only.

FIG. 1 is a block diagram illustrating a generalized structure for the present invention. Two basic functions are illustrated: (1) adding/modifying various parameters and (2) searching. The present invention may utilize a variety of parameters depending on the particular embodiment or user of the invention. In the business-community embodiment illustrated in FIG. 2, these parameters include (a) industry, (b) community and (c) company. However, for other applications, the parameters are the content of the same can be quite varied. For illustration purposes only, a few examples may include:

Suppliers and Purchasers
    Product specifications
    Shipping channels

Delivery Availability
Project Requirements
Forums and Speakers
  Venue specifications
  Demographics of population in proximity to venue
  Availability of speakers
  Specialty of speakers
Job Opportunities and Potential Employees
  Job requirements
  Location descriptions
  Employee experience
  Employee education
  Salary requirement Once the parametrical information is loaded, the present invention operates to provide compatible associations between the supported entities through the searching function.

Generally, the parametrical information includes entity criteria, entity criterion weights, and entity criterion levels. The entity criteria corresponds to characteristics that a first entity is looking for in a second entity. The entity criterion weights correspond to the importance of each entity criterion. The entity criterion levels correspond to the attributes of a second entity as they relate to the entity criteria. These concepts will be described in greater detail in FIG. 2 as they relate to the specific embodiment of community and industry matches.

The population of the parameters can be performed in a variety of manner including manual loading, incorporation of data bases from various information suppliers and even through the use of web services that may provide for dynamic updating of the parameters with current information.

Figure 2:
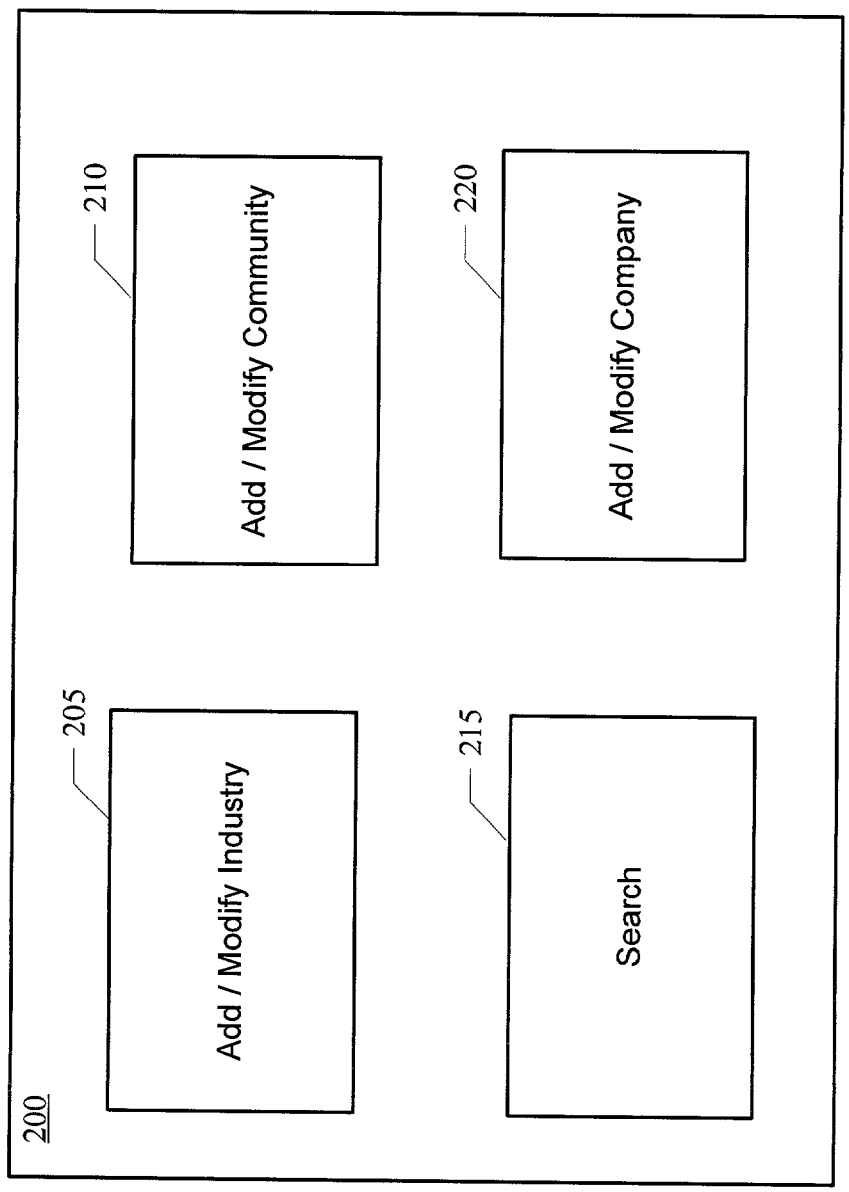
FIG. 2 is a block diagram that illustrates the principle functions of an exemplary embodiment of the present invention.

FIG. 2 is a block diagram that illustrates the principle functions of the present invention embodied in a company-community application. The operations described can be applicable to other embodiments as well. To allow both companies and industries to identify compatible matches, the business location system 200 (the 'system') includes, but is not limited to, four basic functions. The system 200 is operable to add or modify industries 205; add or modify communities 210; add or modify companies 220; and search for compatibility matches between companies/industries and communities 215.

In an exemplary embodiment of the present invention, the business location system 200 is preloaded with data for numerous industries, companies, and communities. In alternative embodiments, the system 200 may only provide a subset of the preloaded data or no preloaded data at all.

One primary function of the business location system 200 is the add/modify industry 205 function. This function allows users of the system 200 to add new industries to, or modify existing industries in the system 200. Industries are defined by various industry criteria. Industry criteria may include, but is not limited to, education level, availability of skilled labor, availability of unskilled labor, electricity demand, gas demand, access to railway, access to airports, access to ground transportation, availability of engineers, availability of scientists, research facilities, warehouse facilities, proximity to customers, and any other criteria representative of the needs of a particular industry. In an exemplary embodiment of the present invention, the number of industry criteria for any single industry is not limited, however, a limit may be used if desired.

It is preferable for a significant quantity of industries to be preloaded into the system 200 prior to distribution to a user. Preloaded industries include industry criteria representative of the needs of the industry. When new communities are added to the system, data is entered about the community for each industry criterion. When numerous industries are preloaded in the system, numerous industry criteria are accordingly included. The inclusion of numerous industry criteria promotes more complete data entry for each community as it is added. If new industries are later added that include unique criteria, the community data may be incomplete and the reliability of the system 200 may be reduced. When this occurs, the community data may be modified. The reduced reliability of the system will only affect searches involving the new criteria. In an exemplary embodiment of the present invention, users are prompted to use existing criteria when defining new industries. This allows the inclusion of new industries without affecting the data of existing communities.

In an exemplary embodiment of the present invention, industry criterion levels are represented on a scale of one to five. Alternatively, any scale may be used to rate the various industry criterion levels. Using a wider scale may allow greater distinction between various communities any may promote more valuable results. Conversely, limiting the scale may promote more simple user interaction.

For example, and not limitation, a sample set of industries is presented. The following table shows sample criteria for three sample industries:

TABLE 1

| Industry | Criteria | Minimum Level | Weight |
|---|---|---|---|
| Chemicals | Skilled Labor | 3 | 30% |
| | Proximity to customers | 2 | 30% |
| | Strong transportation infrastructure | 3 | 15% |
| | Availability and proximity of raw materials | 3 | 15% |
| | Reliable power supply | 3 | 10% |
| Electronic Manufacturing | Labor availability and costs | 3 | 25% |
| | Skilled Labor | 4 | 30% |
| | Industry cluster: presence of companies within the electronics industry | 4 | 25% |
| | Academic institutions and research resources | 3 | 20% |
| Manufacture of Construction Equipment | Labor Costs | 3 | 35% |
| | Access to inexpensive steel | 3 | 30% |
| | Low utility rates | 2 | 20% |
| | Strong construction sector | 3 | 10% |
| | Reasonable environmental and worker safety regulations | 2 | 5% |

As is shown in Table 1, each industry is associated with multiple industry criteria. Each industry criterion is associated with a level and a weight. The industry criterion level is scaled between one and five and is representative of the relative strength needed for that criterion for the associated industry. If the industry criterion level is a one, then the industry needs a minimal level of that criterion, if the industry criterion level is five, then the industry needs a maximum level of that criterion. Typically, each industry criterion level will be representative of a specified level of competency. For example, and not limitation, Table 2 shows exemplary transportation infrastructure criterion levels:

TABLE 2

| Level | Infrastructure |
|---|---|
| 1 | Unpaved Roads |
| 2 | Paved Roads |
| 3 | Interstate-Grade Highway System |
| 4 | Railroad or Airport Service |
| 5 | Railroad and Airport Service |

The minimum infrastructure required for an industry is selected for the minimum level in the industry criteria chart. When the community data is entered, Table 2 is used to determine the appropriate industry criterion level for that particular attribute of the community. The computer and electronics manufacturing industry may need the transportation infrastructure to be at least at level 3 because they need to transport raw materials and finished products, while the fast food industry may only need a level 1 because they only need to import food product and allow access to customers. When a search is performed to locate compatible communities, only those communities with at least the minimum level for each criterion will be returned. In an alternative embodiment of the present invention, the minimum levels are not included. In such embodiments, there is not a minimum cut off for returning compatible matches and all matches may be returned. In such an alternative embodiment, Table 2 may still be used to determine the appropriate industry criterion level for the community.

In another alternate embodiment of the present invention, the industry criterion levels are assigned in a more subjective manner. Using subjective assignments, criterion levels are not associated with a set standard. Accordingly, the industry criterion levels for each community are assigned based on a subjective comparison to the attributes of other communities. In such an embodiment, it is preferable for one with substantial knowledge of numerous communities to assist in assigning the industry weights for the community data. For example, and not limitation, an economic development professional may be used to assist communities in assessing the relative industry criterion levels for the community. In some applications, the subjective approach may be preferable because historically economic development has been a very subjective art. Conversely, for mass production and distribution to the public, it is preferable for a standard to be set that quantifies how each criterion level should be assigned. Users lacking training and knowledge of other communities may not be able to accurately assess the relative industry criterion level that should be assigned to a particular community.

The industry criterion weights shown in Table 1 indicates the relative importance of each of the industry criteria. The total of the industry criterion weights for all criteria of a given industry should sum to 100%. The industry criterion weights are used for calculating the relative compatibility of communities when performing an industry compatibility search.

Relative compatibilities of communities and industries are calculated by multiplying each criterion factor by the criterion weight and summing the products. After the products are summed, the sum is divided by the maximum criterion level, i.e., the maximum criterion level is five if the industry criterion levels are assigned on a scale of one to five. This procedure yields a percentage match. A match above 75% is typically considered a good match, between 50–75% is a fair match and below 50% is a poor match. Additionally, regardless of the percentage match, a community/industry match may be eliminated if any single community criterion level is below the industry's minimum criterion level.

In order to demonstrate how the matching of compatible communities is performed, an example is presented using two exemplary communities. The information regarding the two communities are shown in Table 3. Sanderville is intended to represent an urban community with exemplary urban resources. Smithstone is intended to represent a rural community with a primarily agricultural economy. The data presented in Table 3 is for example only, and not limitation.

TABLE 3

| Criteria | Sanderville Community Levels | Smithstone Community Levels |
|---|---|---|
| Skilled Labor | 4 | 4 |
| Proximity to customers | 4 | 2 |
| Strong transportation infrastructure | 5 | 3 |
| Availability and proximity of raw materials | 4 | 4 |
| Reliable power supply | 4 | 3 |
| Labor availability and costs | 4 | 4 |
| Industry cluster: presence of companies within the electronics industry | 5 | 3 |
| Academic institutions and research resources | 4 | 2 |
| Labor Costs | 3 | 5 |
| Access to inexpensive steel | 3 | 5 |
| Low utility rates | 2 | 4 |
| Strong construction sector | 2 | 4 |
| Reasonable environmental and worker safety regulations | 2 | 4 |

Analyzing the industry data for each of the two exemplary communities shows how well the communities match with each of the three exemplary industries.

The equation used to calculate the percentage match is shown as follows:

$$PM = [(CL_1 * CW_1) + (CL_2 * CW_2) + \ldots + (CL_N * CW_N)] / MCL$$

where:

PM=Percentage Match (between a community and an industry

CL=Criterion Level (for particular industry criterion)

CW=Criterion Weight (for particular industry criterion)

MCL=Maximum Criterion Level (i.e. 5 if criterion level on scale of 1–5)

Table 4 shows the industry criterion levels for Sanderville and the calculations for identifying the corresponding match percentage for each of the three exemplary industries.

TABLE 4

| Industry | Criteria | Sanderville Level | Weight | Weighted Level: (Level * Weight) |
|---|---|---|---|---|
| Chemicals | Skilled Labor | 4 | 30% | 1.2 |
| | Proximity to customers | 4 | 30% | 1.2 |
| | Strong transportation infrastructure | 5 | 15% | .75 |
| | Availability and proximity of raw materials | 4 | 15% | .6 |
| | Reliable power | 4 | 10% | .4 |
| | Sum of Products | | | 4.15 |
| | Percent Match (sum/5) | | | 83% |
| Electronic Design | Labor availability and costs | 4 | 25% | 1 |
| | Skilled Labor | 4 | 30% | 1.2 |
| | Industry cluster: presence of companies within the electronics industry | 5 | 25% | 1.25 |
| | Academic institutions and research resources | 4 | 20% | .8 |
| | Sum of Products | | | 4.25 |
| | Percent Match (sum/5) | | | 85% |
| Manufacture of Construction Equipment | Labor Costs | 3 | 35% | 1.05 |
| | Access to inexpensive steel | 3 | 30% | .9 |
| | Low utility rates | 2 | 20% | .4 |
| | Strong construction sector | 2 | 10% | .2 |
| | Reasonable environmental and worker safety regulations | 2 | 5% | .1 |
| | Sum of Products | | | 2.65 |
| | Percent Match (sum/5) | | | 53% |

From the calculations shown in Table 4 above, Sanderville has an 83% compatibility match with the Chemical Industry, an 85% compatibility match with the Electronic Design Industry, and a 53% compatibility match with the Construction Equipment Manufacturing industry. Accordingly, the Chemical Manufacture and Electronic Design would be good matches for Sanderville, and Construction Equipment manufacture would be a fair to poor match. Additionally, the Construction Equipment Manufacture industry has a minimum "Strong construction sector" level of 3, while Sanderville has a level of 2 for that criterion.

Accordingly, if minimum levels are used, Sanderville would not match with the Construction Equipment Manufacturing industry because it falls below the minimum requirements. Accordingly, in an exemplary embodiment of the present invention, the percentage match would not be returned for this potential match because Sanderville does not meet the requirements.

Table 4 shows the industry criterion levels for Smithstone and the calculations for identifying the corresponding compatibility match percentage for each of the three exemplary industries.

TABLE 5

| Industry | Criteria | Smithstone Level | Weight | Weighted Level: (Level * Weight) |
|---|---|---|---|---|
| Chemicals | Skilled Labor | 4 | 30% | 1.2 |
| | Proximity to customers | 2 | 30% | .6 |
| | Strong transportation infrastructure | 3 | 15% | .45 |
| | Availability and proximity of raw materials | 4 | 15% | .6 |
| | Reliable power supply | 3 | 10% | .3 |
| | Sum of Products | | | 3.15 |
| | Percent Match (sum/5) | | | 63% |
| Electronic Manufacturing | Labor availability and costs | 4 | 25% | 1 |
| | Skilled Labor | 4 | 30% | 1.2 |
| | Industry cluster: presence of companies within the electronics industry | 3 | 25% | .75 |
| | Academic institutions and research resources | 2 | 20% | .4 |
| | Sum of Products | | | 3.35 |
| | Percent Match (sum/5) | | | 67% |
| Manufacture of Construction Equipment | Labor Costs | 5 | 35% | 1.75 |
| | Access to inexpensive steel | 5 | 30% | 1.5 |
| | Low utility rates | 4 | 20% | .8 |
| | Strong construction sector | 4 | 10% | .4 |
| | Reasonable environmental and worker safety regulations | 4 | 5% | .25 |
| | Sum of Products | | | 4.7 |
| | Percent Match (sum/5) | | | 94% |

From the calculations shown in Table 5 above, Smithstone has a 63% compatibility match with the Chemical Industry, a 67% compatibility match with the Electronic Design Industry, and a 94% compatibility match with the Construction Equipment Manufacturing industry. Accordingly, Chemical Manufacture and Electronic Design would be fair matches for Smithstone, and Construction Equipment manufacture would be a good match. Additionally, the Electronic Design industry has a minimum "Academic institutions" level of 3, while Smithstone has a level of 2. Accordingly, if minimum levels are used, Smithstone would not be a match with the Electronic Design industry because it falls below the minimum requirements. Accordingly, in an exemplary embodiment of the present invention, the percentage match would not be returned for this potential match because Smithstone does not meet the requirements.

The above example may also be used to demonstrate that a representative of a company in the Electronic Design industry performing a search to locate compatible communities in which to locate would identify Sanderville as a good match and Smithstone as a poor match. Accordingly, the company may choose to locate in Sanderville.

Figure 3:
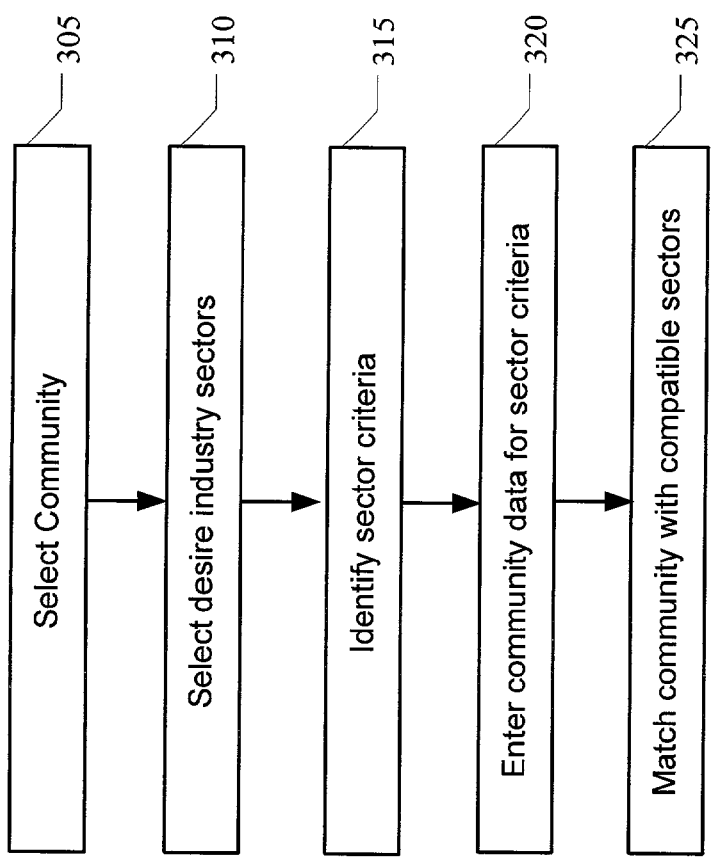
FIG. 3 is a flow diagram that illustrates a method for communities to identify compatible industries.

FIG. 3 is a flow diagram that illustrates a method for communities to identify compatible industries according to an exemplary embodiment of the present invention. When a user initiates an industry compatibility search for a community, the first step is to select the desired community 305 and the desired industry sectors 310 that the community wishes to consider. The user may search all industries, or limit the search to only those industries the community has identified. Once the industries are selected 310, the system 200 identifies the industry sector criteria associated with the selected industries 315. Typically, the industry sector criteria required for a particular search will be a subset of all of the industry sector criteria. The system 200 may display the industry sector criteria and the associated community data for the industry sector criteria for the user of the system to review. If the community data is inaccurate or incomplete, the user may modify the community data 320. In an alternative embodiment of the present invention, the community data is not preloaded into the system 200 and the user enters the community data for each sector criterion 320 prior to each search. After the community data is entered or verified, the system 200 calculates a percentage match with each of the selected industries 325.

FIG. 4 is a flow diagram illustrating a method for companies to identify compatible communities according to an exemplary embodiment of the present invention. When a user initiates a community compatibility search for a company, the first step is to select the desired company 405 and the desired industry sectors 410 that the company wishes to search. The company may search in all industries in which it does business or a subset of those industries. After selecting the industries for the search, the user reviews the industry sector criteria to determine whether the company has any specific needs that require modification to the base industry criteria 415. Alternative embodiments of the present invention may not allow companies to modify the industry criteria. One the industry search criteria are set, the system 200 searches the community data to determine which communities have high compatibility scores 420. The compatibility scores are determined according to the method and equation described above.

Throughout the specification, the terms industry criterion levels, entity criterion levels, or other similar descriptions may be used to describe, among other things, community data. In alternative embodiments of the present invention in which compatibility matches are determined for entities other than communities and industries, (i.e., suppliers and purchasers, forums and speakers, etc.) the descriptions of the matching data are typically referred to as entity data. Accordingly, entity criteria, entity criterion levels, entity criterion weights, and entity matches may generically be used in place of industry criteria, industry criterion levels, industry criterion weights, and industry-community matches respectively.

While this invention has been described in detail with particular reference to preferred embodiments thereof, it will be understood that variations and modifications can be effected within the scope of the invention as defined in the appended claims.

What is claimed is:

1. A computer implemented method for identifying compatibility matches between a first entity and a second entity, comprising the steps of:
   identifying one or more entity criteria for the first entity, the first entity being a company operating within an industry and the entity criteria being characteristics associated with the industry;
   identifying entity criteria levels for the second entity corresponding to the entity criteria, the second entity being a community;
   identifying entity criterion weights corresponding to a relative importance of each entity criterion to the first entity;
   calculating a percentage match using the entity criterion levels and the entity criterion weights in accordance with the following equation:

$$PM=[(CL_1*CW_1)+(CL_2*CW_2)+ \ldots +(CL_N*CW_N)]/MCL; \text{ and}$$

providing the percentage match as a compatibility measurement between the first entity and the second entity.

2. A computer system for generating a compatibility match value for communities and industries, the system being operative to:
   receive a selection of a community to be examined;
   receive a selection of an industry for which to examine the selected community;
   receive a selection of a plurality of criterion for the industry;
   for each of the plurality of criterion, assign a criterion level $CL_X$;
   for each of the plurality of criterion, assigning a criterion weight $CW_X$;
   assigning a maximum criterion level value MCL; and
   generating the compatibility match value PM based at least in part on the equation of: $PM=[(CL_1*CW_1)+(CL_2*CW_2)+ \ldots +(CL_N*CW_N)]/MCL$.

* * * * *